US010525953B2

(12) United States Patent
Eberhart et al.

(10) Patent No.: US 10,525,953 B2
(45) Date of Patent: Jan. 7, 2020

(54) BRAKE BOOSTER WITH A MODULAR-SYSTEM-OPTIMIZED HOUSING SHELL

(71) Applicant: Continental Teves AG & Co. oHG, Frankfurt am Main (DE)

(72) Inventors: Rene Peter Eberhart, Oberursel (DE); Jürgen Faller, Kahl (DE)

(73) Assignee: Continental Teves AG & Co. oHG, Frankfurt am Main (DE)

( * ) Notice: Subject to any disclaimer, the term of this patent is extended or adjusted under 35 U.S.C. 154(b) by 0 days.

(21) Appl. No.: 16/466,840

(22) PCT Filed: Nov. 17, 2017

(86) PCT No.: PCT/EP2017/079597
§ 371 (c)(1),
(2) Date: Jun. 5, 2019

(87) PCT Pub. No.: WO2018/108449
PCT Pub. Date: Jun. 21, 2018

(65) Prior Publication Data
US 2019/0315327 A1    Oct. 17, 2019

(30) Foreign Application Priority Data
Dec. 15, 2016   (DE) .......................... 10 2016 225 210

(51) Int. Cl.
*B60T 13/567*     (2006.01)
*F04B 53/16*      (2006.01)

(52) U.S. Cl.
CPC ............ *B60T 13/567* (2013.01); *F04B 53/16* (2013.01)

(58) Field of Classification Search
CPC ...................................................... B60T 13/567
See application file for complete search history.

(56) References Cited

U.S. PATENT DOCUMENTS 2,972,983 A * 2/1961 Ayers, Jr. .............. B60T 13/244
                                                      91/369.4
4,445,331 A * 5/1984 Weiler .................. F16B 35/048
                                                      60/547.1

(Continued)

FOREIGN PATENT DOCUMENTS

DE      3041883 A1    6/1982
DE     10008795 A1    9/2001

(Continued)

OTHER PUBLICATIONS

German Search Report for German Application No. 10 2016 225 210.0, with partial translation, dated Nov. 9, 2017—8 pages.

(Continued)

*Primary Examiner* — Thomas E Lazo
(74) *Attorney, Agent, or Firm* — RatnerPrestia

(57) ABSTRACT

A pneumatic brake booster including a booster housing having at least one housing shell. The housing shell is designed to be substantially pot-shaped with a center axis, a base portion and a lateral portion, and the base portion has a curved or conical wall region. In order to offer a brake booster by which it is possible to cost-effectively realize improved adaptability to customer- and application-specific requirements with respect to the spatial connection arrangement, at least one flattened surface area is formed in a radial outer region of the base portion, is designed to be elongate in the circumferential direction and has, at its radial outer edge, at least two notches which are arranged with respect to one another in a defined grid pattern with a circle angle.

16 Claims, 3 Drawing Sheets

(56) References Cited

U.S. PATENT DOCUMENTS

| | | | | |
|---|---|---|---|---|
| 4,492,081 A | * | 1/1985 | Weiler | B60T 13/567 |
| | | | | 60/547.1 |
| 4,598,548 A | | 7/1986 | Wagner | |
| 4,807,521 A | * | 2/1989 | Uyama | B60T 13/567 |
| | | | | 92/169.1 |

FOREIGN PATENT DOCUMENTS

| | | |
|---|---|---|
| DE | 10122952 A1 | 9/2002 |
| DE | 102010001812 A1 | 10/2010 |
| DE | 102012208866 A1 | 11/2012 |
| FR | 2537524 A1 | 6/1984 |

OTHER PUBLICATIONS

International Search Report and Written Opinion for International Application No. PCT/EP2017/079597, dated Feb. 28, 2018—8 pages.

English Translation of the Written Opinion for International Application No. PCT/EP2017/079597, dated Feb. 28, 2018—4 pages.

* cited by examiner

BRAKE BOOSTER WITH A MODULAR-SYSTEM-OPTIMIZED HOUSING SHELL

CROSS REFERENCE TO RELATED APPLICATIONS

This application is the U.S. National Phase Application of PCT International Application No. PCT/EP2017/079597, filed Nov. 17, 2017, which claims priority to German Patent Application No. 10 2016 22.5 210.0, filed Dec. 15, 2016, the contents of such applications being incorporated by reference herein.

FIELD OF THE INVENTION

The invention relates to a pneumatic brake booster particularly for a hydraulic motor vehicle brake system and to a modular system for the optimized construction of application-specific versions of the brake booster.

BACKGROUND OF THE INVENTION

Pneumatic brake boosters are known in principle and are widespread. The booster housing of such a brake booster is usually produced from thin-walled metal sheet by forming. One or more connections for establishing pneumatic and/or electrical connections must customarily be mounted on one or more housing shells of such a housing.

The spatial positions and angular positions for these connections vary depending on the application, and the brake booster must be adapted for the respectively required position and angular position.

There therefore exists a need to optimize the brake booster to the effect that an adaptation to the respectively required position of the connections can occur with the lowest possible cost and modification effort.

It is known from DE 101 22 952 A1, incorporated herein by reference, to provide in a housing shell one or more bulges which are distributed on the circumference of the housing shell, are each adapted to an individual connection piece and also, through their design, ensure an antirotation safeguard and thus a defined spatial position for the connection piece.

However, such a solution requires, for the production of different variants of the housing shell, a plurality of deep-drawing tools or at least considerable adaptations to a tool and long conversion times and, in addition, a particularly accurate and reliable preplanning of the required numbers of the individual variants in order to minimize the stock keeping.

SUMMARY OF THE INVENTION

An aspect of the invention is a brake booster by means of which it is possible to cost-effectively realize improved adaptability to customer- and application-specific requirements with respect to the spatial connection arrangement.

BRIEF DESCRIPTION OF THE DRAWINGS

The details and advantages of aspects of the invention will be explained in more detail in the following on the basis of descriptions of the figures. In this context, the description of generally known aspects and functions of a brake booster of the generic type will be largely dispensed with, and only the details which are relevant to aspects of the invention will be discussed.

Specifically.

DETAILED DESCRIPTION OF THE PREFERRED EMBODIMENTS

FIG. 1

Figure 1:
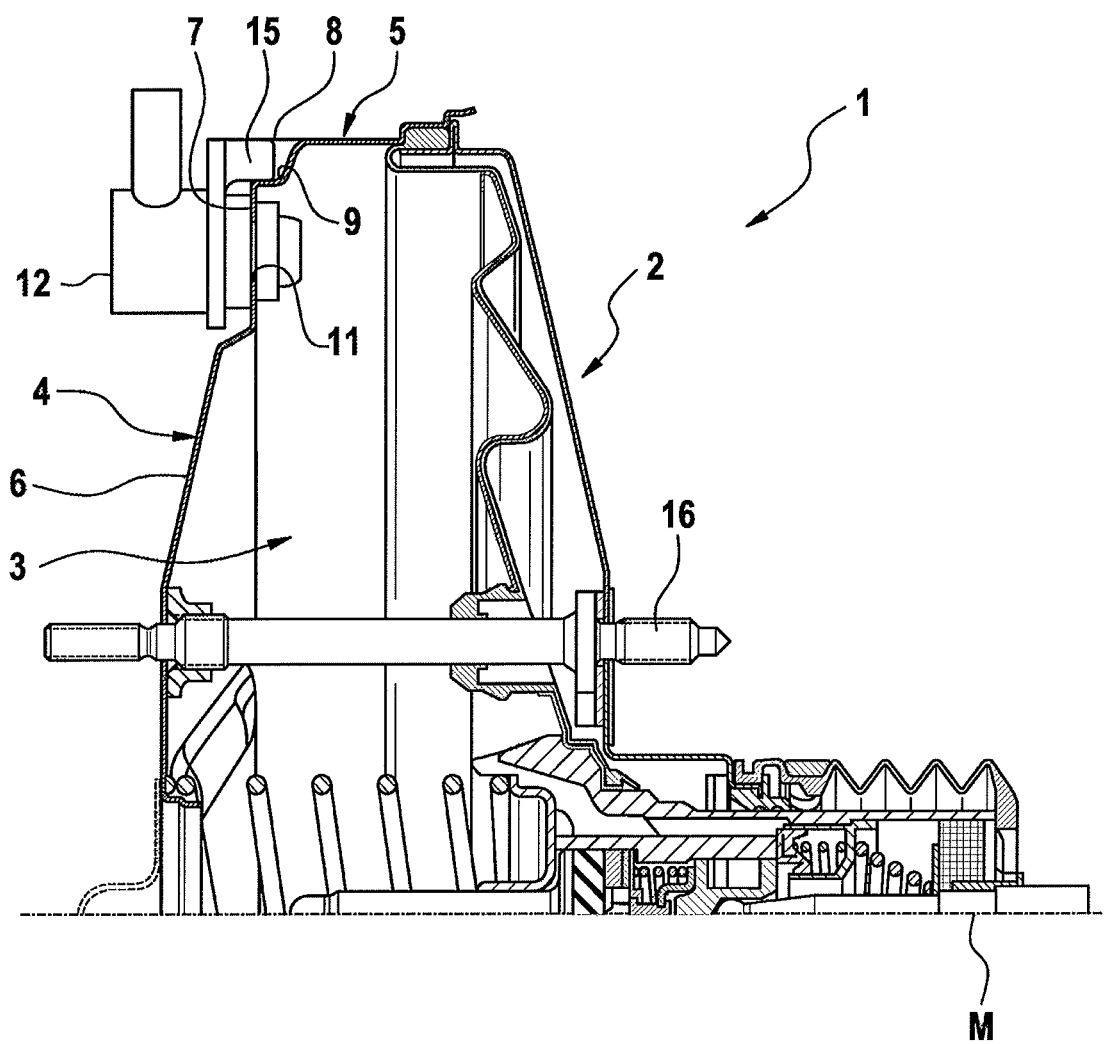
FIG. 1 shows an embodiment according to an aspect of the invention of the brake booster in axial section.

A pneumatic brake booster 1 has a thin-walled booster housing 2 with a housing shell 3 which is produced by forming, usually from a sheet metal material by means of a deep-drawing process. The housing shell 3 is designed to be substantially pot-shaped and largely rotationally symmetrical about a center axis M, with the result that an axially end-side base portion 4 and a lateral portion 5 which runs around radially can be defined.

For reasons of stability, the base portion 4 is to a large part formed, as in the present exemplary embodiment, by a conical wall region 6 or by a wall region 6 which is in some other way curved axially outward.

In the radial outer region of the base portion 4, the housing shell 3 according to an aspect of the invention has a planar flattened surface area 7 which is offset axially inward with respect to the adjacent conical wall region 6 and which is oriented substantially orthogonally to the center axis M. At the radial outer edge 8 of the surface area 7, at the transition into the lateral portion 5, a notch 9 is formed in the housing shell 3. In addition, an aperture 11 is arranged through the wall of the housing shell 3 within the surface area.

A component 12, the position and/or angular position of which on the circumference of the brake booster 1 must be implemented, is plugged into the aperture 1 and has, for antirotation safeguarding, an antirotation safeguard element 15 which is designed as a projection arranged on an arm and which engages positively in the notch 9. The component 12 can be, for example, a pneumatic connection piece, an electrical plug or another comparable component.

FIG. 2

Figure 2:
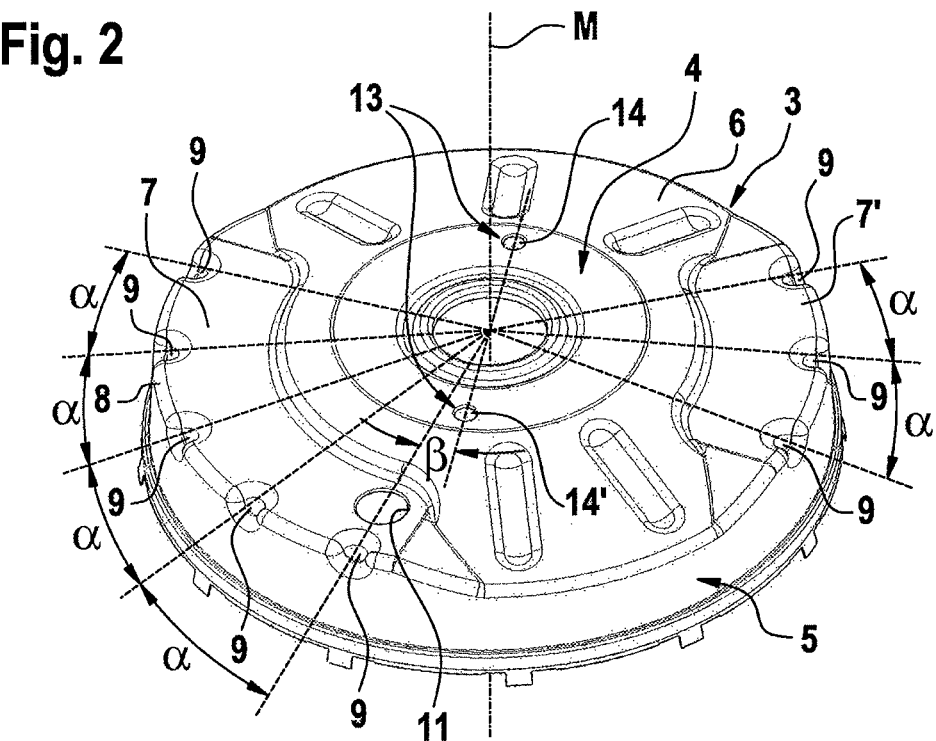
FIG. 2 shows a three-dimensional illustration of a first embodiment according to an aspect of the invention of a housing shell.

FIG. 2 shows a first embodiment according to an aspect of the invention of an improved housing shell 3 in a three-dimensional illustration.

Two planar surface areas 7 and 7' offset with respect to one another in the circumferential direction are formed in the radially outer region of the base portion 4. Each surface area is designed to be elongate in the circumferential direction and has at its radial outer edge 8 in each case a plurality of, but identically or uniformly formed, notches 9. The number n of notches 9 is different in each surface area and, in the smaller surface area 7', is n=3 and, in the larger surface area 7, is n=3+2 or n=5. For optimum adaptability of the housing shell 3, a surface area should preferably be designed for at least two notches 9. The notches 9 are arranged offset with respect to one another about the center axis M in the circumferential direction in a defined grid pattern with a circle angle α.

The aperture 11 for receiving a further component 12 is assigned to a certain notch 9, whereby the position and angular position of the components 12 to be inserted therein is clearly determined.

In order to fasten the brake booster 1 in the vehicle, use is made of fastening elements 16 which project through the booster housing 2 and hence also the housing shell 3 through the holes 14, 14' and, by virtue of their fixed position with respect to one another, define a certain hole pattern 13.

The rotation position or angular position about the center axis M of the housing shell 3 in the vehicle is determined by the rotation angle β of the hole pattern 13.

Thus, an efficient optimized modular system can be created in which the respectively required variants of the brake booster 1 can be produced merely by varying the housing shell 3, with the adaptation of the housing shell 3 to the respectively required variant occurring in a particularly simple and flexible manner on account of its configuration according to an aspect of the invention.

A simple variation of the rotation angle β and/or of the arrangement of the aperture 11 at a certain notch 9 allows any desired circumferential or angular position of the component 12 to be realized with a reduced outlay by an only minor adaptation of the tool.

A certain arrangement pattern with a plurality of apertures 11 in a housing shell 3, for example for a plurality of connections, can also be realized without large additional outlay.

As a result of a clear uniform grid patterning and the provision of a relatively elongate planar surface area 7, all that is required in the tool is for the angular position of the punching inserts for the aperture(s) 11 and for the hole pattern 13 to be changed in order to produce any desired required variant of the housing shell 3, and thus of the brake booster 1.

It is also possible for the housing shell 11 first to be produced cost-effectively in large numbers as a universal semifinished product without the aforementioned apertures or holes and to let the punching of the aperture 11 and the hole pattern 13 be carried out in a downstream manufacturing step in the specifically required variant with a favorable punching tool.

FIG. 3

Figure 3:
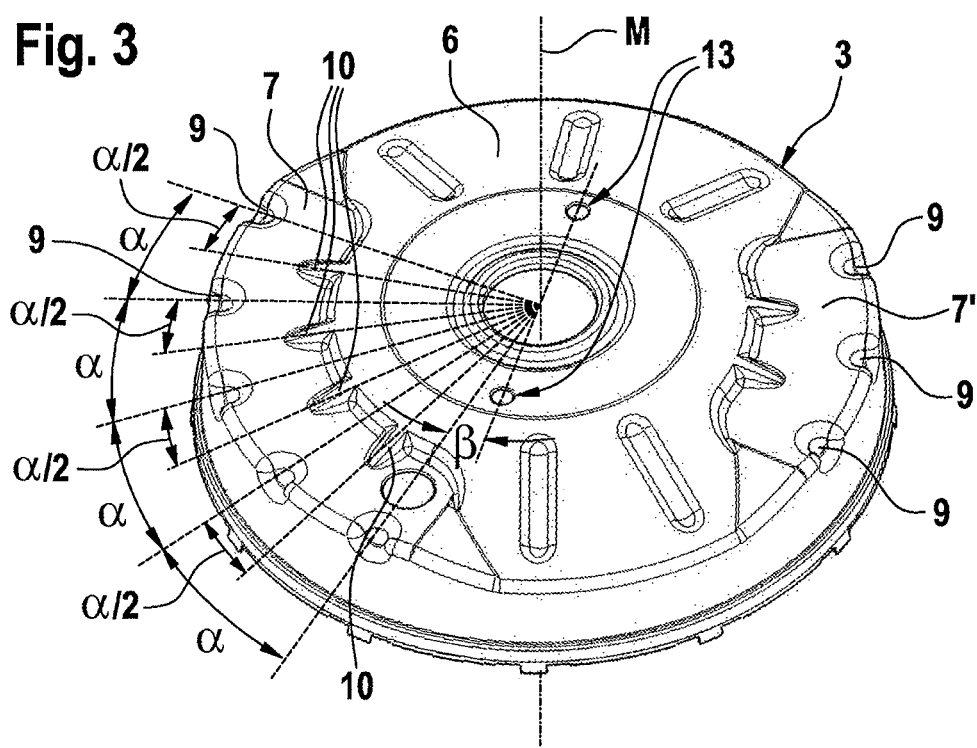
FIG. 3 shows a three-dimensional illustration of a second embodiment according to an aspect of the invention of a housing shell.

FIG. 3 shows a second embodiment according to an aspect of the invention of an improved housing shell 3. Owing to their planar configuration, the surface areas 7 reduce the stability of the housing shell 3 because the percentage fraction of the conical or curved wall region 6 on the overall base portion 4 is thereby reduced. In order to counteract this, the embodiment shown here has separate rib like projections 10 which project radially outward from the wall region 6 into the surface area 7.

The projections 10 are positioned offset in the circumferential direction with respect to the grid pattern of the notches 9 by in each case the half of the circle angle α and thereby in each case between two adjacent notches 9. Analogously, in each case one projection 10 less is required than the number n of notches on a surface area 7, 7'.

The adaptability of the housing shell 3 to different variants is in no way adversely affected by the projections, because neither the positionability of the aperture 11 nor of the component 11 is thereby disturbed.

Figure 4:
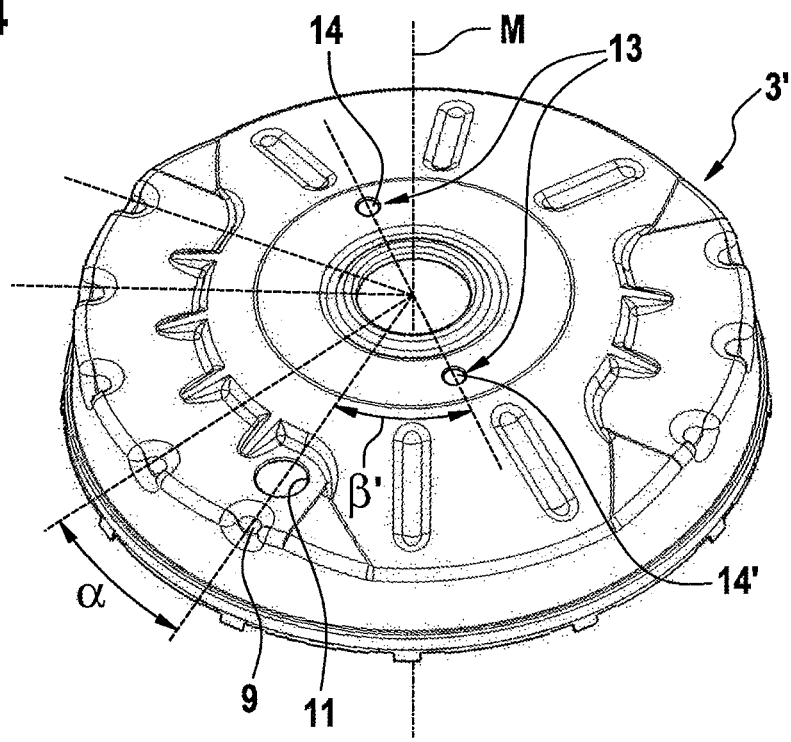
FIGS. 4 and 5 show a three-dimensional illustration of two variants of a housing shell within a modular system according to an aspect of the invention.
Figure 5:
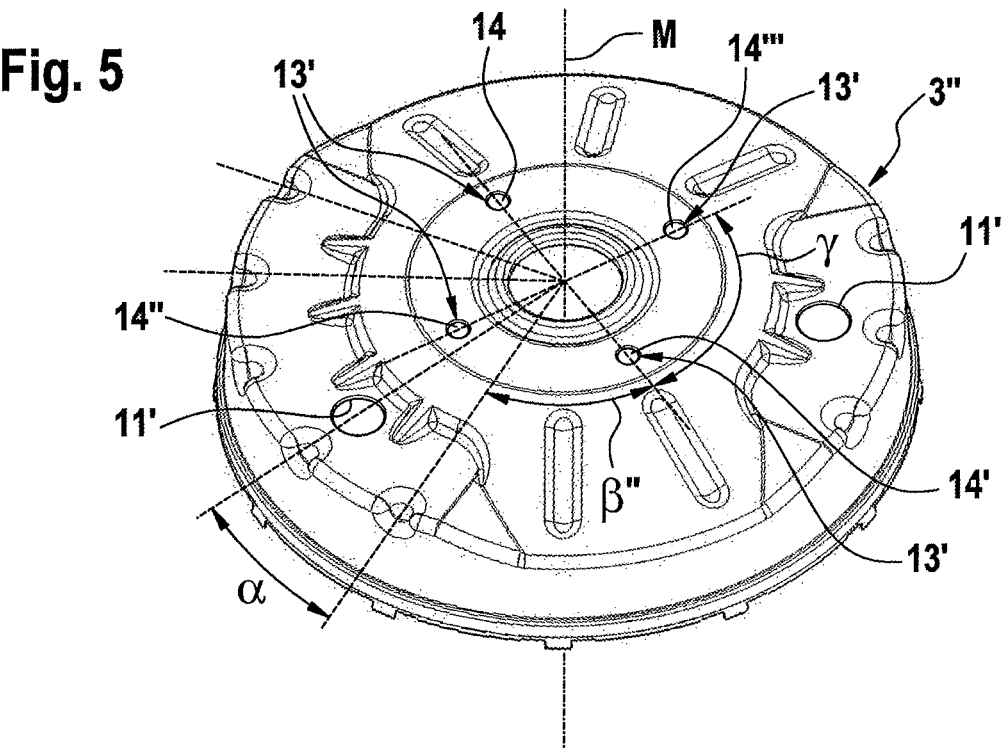

FIGS. 4 and 5

FIGS. 4 and 5 illustrate the construction principle of the modular system and the variability of the housing shell 3.

In the variant of the housing shell 3' in FIG. 4, the hole pattern 13, by contrast with the embodiment of the housing shell 3 according to FIG. 3, is arranged by a rotation angle β', instead of β, with respect to the grid pattern of the notches 9, with the result that the height position of the aperture 11 and of the associated notch 9 and the angular position of the component 12 to be inserted into the aperture 11 changed in the vehicle.

In the variant of the housing shell 3" in FIG. 5, the hole pattern 13' has been changed in that, in addition to the above-described axisymmetrical hole pairing 14 and 14', a further hole pairing 14" and 14'" rotated by a hole angle γ has been added, the hole pattern 13' has been arranged with another rotation angle β" and, instead, an arrangement pattern with two apertures 11' that differs from previously shown variants has been used.

LIST OF REFERENCE SIGNS 1 brake booster
2 booster housing
3 housing shell
4 base portion
5 lateral portion
6 wall region
7 surface area
8 outer edge
9 notch
10 projection
11 aperture
12 component
13 hole pattern
14 hole
15 antirotation safeguard element
16 fastening element
α circle angle
β rotation angle
γ hole angle
M center axis

The invention claimed is:

1. A pneumatic brake booster comprising a booster housing having at least one housing shell, wherein the housing shell is substantially pot-shaped with a center axis, a base portion and a lateral portion, and the base portion has a curved or conical wall portion, wherein at least one flattened surface area is formed in a radial outer region of the base portion, is designed to be elongate in a circumferential direction and has, at its radial outer edge, at least two notches which are arranged with respect to one another in a defined grid pattern with a circle angle.

2. The brake booster as claimed in claim 1, wherein the surface area is arranged so as to positioned axially inward with respect to the wall region.

3. The brake booster as claimed in claim 1, wherein the surface area is designed to be substantially planar and orthogonal to the center axis.

4. The brake booster as claimed in claim 3, wherein the notches are of uniform design.

5. The brake booster as claimed in claim 1, wherein the notches are designed to project into the lateral portion.

6. The brake booster as claimed in claim 1, wherein at least one projection formed on the housing shell, projects radially outwards from the wall region into the surface area and is positioned in the circumferential direction between two adjacent notches.

7. The brake booster as claimed in claim 6, wherein surface area has a number, n>2 notches and n−1 projections, and each projection is positioned in the circumferential direction between two adjacent notches.

8. The brake booster as claimed in claim 7, wherein the projection is positioned offset in the circumferential direction with respect to the notches by in each case half of the circle angle.

9. The brake booster as claimed in claim 6, wherein the projection is positioned offset in the circumferential direction with respect to the notches by in each case half of the circle angle.

10. The brake booster as claimed in claim 1, wherein at least two surface areas offset with respect to one another in the circumferential direction are formed in the housing shell.

11. The brake booster as claimed in claim 10, wherein at least one aperture for receiving a further component and assigned to a defined notch is arranged in at least one surface area.

12. The brake booster as claimed in claim 1, wherein the surface areas each have a different number of notches.

13. The brake booster as claimed in claim 1, wherein at least one aperture for receiving a further component and assigned to a defined notch is arranged in at least one surface area.

14. A modular system comprising two or more housing shells as claimed in claim 13, wherein each housing shell has a dedicated defined arrangement pattern of the aperture.

15. A modular system comprising two or more housing shells as claimed in claim 1, wherein each housing shell has, in the base portion, a defined hole pattern with at least two holes, and each housing shell is assigned a dedicated rotation angle by which the hole pattern is arranged offset in the circumferential direction about the center axis with respect to the grid pattern of the notches.

16. The modular system as claimed in claim 15, wherein the hole pattern at least two holes are arranged axisymmetrically with respect to one another about the center axis.

* * * * *